US010774449B2

(12) United States Patent
Yoon et al.

(10) Patent No.: US 10,774,449 B2
(45) Date of Patent: Sep. 15, 2020

(54) DEVICE FOR PRODUCING CARBON NANOTUBE FIBERS AND METHOD FOR PRODUCING CARBON NANOTUBE FIBERS USING SAME

(71) Applicant: LG CHEM, LTD., Seoul (KR)

(72) Inventors: Ki Yong Yoon, Daejeon (KR); YoungHo Lee, Daejeon (KR); Ji Eun Kim, Daejeon (KR); Yongjin Choe, Daejeon (KR)

(73) Assignee: LG CHEM, LTD., Seoul (KR)

( * ) Notice: Subject to any disclaimer, the term of this patent is extended or adjusted under 35 U.S.C. 154(b) by 379 days.

(21) Appl. No.: 15/514,106

(22) PCT Filed: Oct. 28, 2015

(86) PCT No.: PCT/KR2015/011428
§ 371 (c)(1),
(2) Date: Mar. 24, 2017

(87) PCT Pub. No.: WO2016/068599
PCT Pub. Date: May 6, 2016

(65) Prior Publication Data
US 2017/0292208 A1    Oct. 12, 2017

(30) Foreign Application Priority Data

Oct. 28, 2014  (KR) .................. 10-2014-0147158

(51) Int. Cl.
*D01F 9/133* (2006.01)
*C01B 32/164* (2017.01)
(Continued)

(52) U.S. Cl.
CPC ............ *D01F 9/133* (2013.01); *C01B 32/162* (2017.08); *C01B 32/164* (2017.08); *D01F 11/16* (2013.01);
(Continued)

(58) Field of Classification Search
CPC ....... D01F 9/133; D01F 11/16; C01B 32/162; C01B 32/164; C01B 2202/08; C01P 2004/13
See application file for complete search history.

(56) References Cited

U.S. PATENT DOCUMENTS 6,790,426 B1 * 9/2004 Ohsaki .................. B82Y 30/00
                                                            423/447.2
7,323,157 B2    1/2008 Kinloch et al.
(Continued)

FOREIGN PATENT DOCUMENTS

CN    203820461 U    9/2014
EP    2631331 A1     8/2013
(Continued)

*Primary Examiner* — Michael M. Robinson
(74) *Attorney, Agent, or Firm* — Dentons, US LLP (57) ABSTRACT

The present invention relates to an apparatus for producing a carbon nanotube fiber. The apparatus includes: a vertical reactor having a reaction zone; a concentric double-pipe inlet tube disposed on top of the reaction zone and consisting of an inner pipe through which a spinning feedstock including a spinning solution and a first gas is introduced into the reaction zone and an outer pipe defining a concentric annular portion surrounding the inner pipe and through which a second gas is introduced into the reaction zone; heating means for heating the reaction zone; and a discharge unit disposed under the bottom of the reaction zone to discharge a carbon nanotube fiber therethrough. The spinning feedstock entering the reaction zone through the inner pipe of the inlet tube is carbonized and graphitized while flowing from the top to the bottom of the reaction zone to form a carbon nanotube fiber consisting of a continuous sock (or aggregates) of carbon nanotubes. The second gas entering the reaction zone through the outer pipe of the inlet tube forms a gas curtain surrounding the circumference of the continuous sock of carbon nanotubes while flowing from the top to
(Continued)

the bottom of the reaction zone. The gas curtain minimizes the contamination of the inner wall of the reactor and facilitates the discharge of the carbon nanotube fiber. Therefore, the apparatus of the present invention is suitable for the production of a carbon nanotube fiber in a continuous manner.

19 Claims, 8 Drawing Sheets

(51) Int. Cl.
    *C01B 32/162* (2017.01)
    *D01F 11/16* (2006.01)

(52) U.S. Cl.
    CPC ...... *C01B 2202/08* (2013.01); *C01P 2004/13* (2013.01)

(56) References Cited

U.S. PATENT DOCUMENTS

| | | | |
|---|---|---|---|
| 9,556,542 B2 | 1/2017 | Oh et al. | |
| 9,969,619 B2 | 5/2018 | Sundaram et al. | |
| 2005/0006801 A1* | 1/2005 | Kinloch | B82Y 30/00 264/5 |
| 2005/0031527 A1 | 2/2005 | Ohsaki | |
| 2008/0107587 A1* | 5/2008 | Yumura | B82Y 30/00 423/447.3 |
| 2009/0053115 A1* | 2/2009 | Jacques | B82Y 30/00 422/150 |
| 2009/0117025 A1* | 5/2009 | Lashmore | B01J 4/002 423/445 R |
| 2015/0240391 A1 | 8/2015 | Oh et al. | |

FOREIGN PATENT DOCUMENTS

| | | |
|---|---|---|
| GB | 002485339 A | 5/2012 |
| GB | 002558486 A | 7/2018 |
| JP | 2001-080913 A | 3/2001 |
| JP | 2003-213531 A | 7/2003 |
| JP | 2012-046841 A | 3/2012 |
| KR | 10-2002-0009875 A | 2/2002 |
| KR | 10-2010-0073149 A | 7/2010 |
| KR | 10-2011-0058029 A | 6/2011 |
| KR | 10-2012-0090383 A | 8/2012 |
| KR | 10-1415078 B1 | 7/2014 |
| WO | 2012-059716 A1 | 5/2012 |
| WO | WO 2012/059716 | 5/2012 |

\* cited by examiner

DEVICE FOR PRODUCING CARBON NANOTUBE FIBERS AND METHOD FOR PRODUCING CARBON NANOTUBE FIBERS USING SAME

This application is a National Stage Entry of International Application No. PCT/KR2015/011428, filed Oct. 28, 2015, and claims the benefit of Korean Application No. 2014-0147158, filed on Oct. 28, 2014, all of which are hereby incorporated by reference in their entirety for all purposes as if fully set forth herein.

BACKGROUND OF THE INVENTION

1. Field of the Invention

The present invention relates to an apparatus for producing a carbon nanotube fiber and a method for producing a carbon nanotube fiber using the apparatus.

2. Description of the Related Art

Carbon nanotubes (CNTs) are allotropes of carbon that are several to tens of nanometers in diameter and hundreds of micrometers to several millimeters in length. Since the synthesis of carbon nanotubes was first reported in Nature by Dr. Iijima in 1991, carbon nanotubes have been investigated in various fields due to their excellent thermal, electrical and physical properties and high length-to-diameter ratio. Such inherent characteristics of carbon nanotubes are attributed to the $sp^2$ bonding of carbon. Carbon nanotubes are stronger than steel and lighter than aluminum, and exhibit high electrical conductivity comparable to metals. Carbon nanotubes can be broadly classified into single-wall carbon nanotubes (SWNTs), double-wall carbon nanotubes (DWNTs), and multi-wall carbon nanotubes (MWNTs) depending on how many they have walls. Carbon nanotubes are divided into zigzag, armchair, and chiral conformations depending on their asymmetry/chirality.

Most of the studies to date have been directed towards the use of dispersions of carbon nanotubes in the form of powders as reinforcing agents of composite materials and the production of transparent conductive films using dispersions of carbon nanotubes. Carbon nanotubes have already reached commercialization in some applications. Dispersion of carbon nanotubes is important for the use of the carbon nanotubes in composite materials and transparent conductive films. However, high cohesive strength of carbon nanotubes due to their strong van der Waals force makes it not easy to disperse the carbon nanotubes at a high concentration while maintaining their dispersibility. Further, in composite materials using carbon nanotubes as reinforcing agents, the excellent characteristics of the carbon nanotubes are not sufficiently exhibited.

Under these circumstances, a great deal of research on the processing of carbon nanotubes into fibers has recently been conducted to produce carbon nanotube structures that sufficiently exhibit the characteristics of carbon nanotubes.

Methods for producing carbon nanotube fibers using a dispersion containing carbon nanotubes and a dispersant are typically based on coagulation spinning, liquid-crystalline spinning, and direct spinning.

According to the coagulation spinning, when a dispersion containing carbon nanotubes and a dispersant is introduced into a polymer solution, the dispersant moves from the dispersion to the polymer solution and the polymer enters the dispersion to replace the dispersant, acting as a binder.

The liquid-crystalline spinning takes advantage of the ability of solutions of carbon nanotubes to form liquid crystals under specified conditions. This method is advantageous in that well-aligned carbon nanotube fibers can be produced, but has the disadvantages of very low spinning speed and strict conditions for the formation of liquid crystals of carbon nanotubes.

Figure 1:
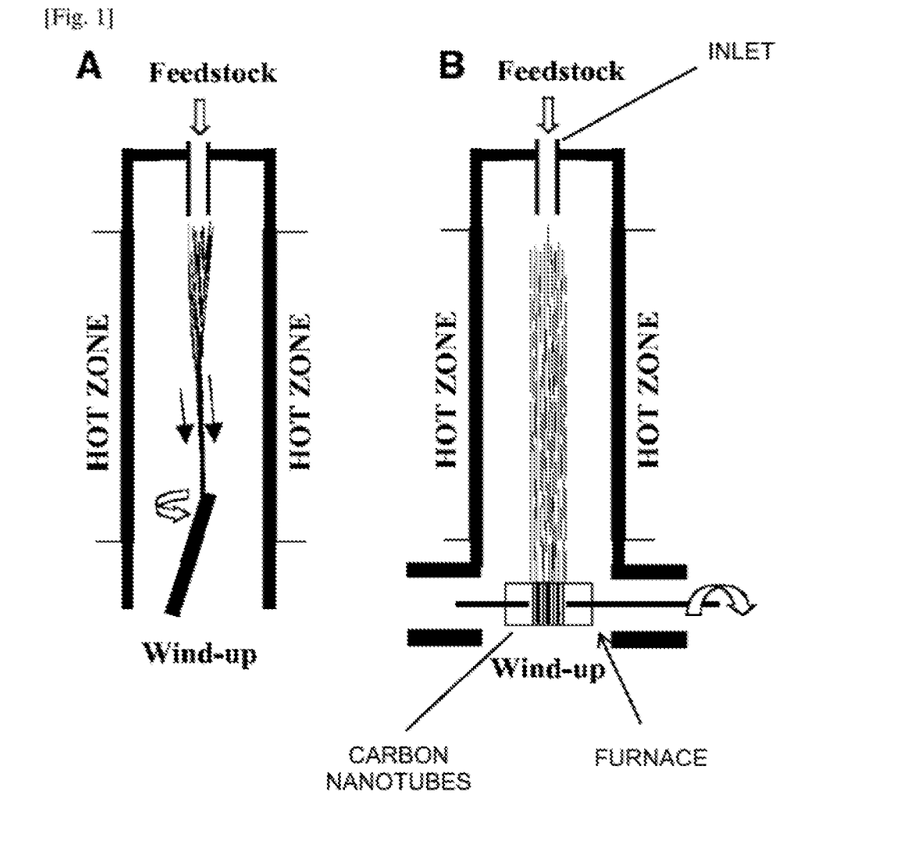
FIG. 1 schematically illustrates conventional methods for producing carbon nanotube fibers by direct spinning.

According to the direct spinning illustrated in FIG. 1, a carbon source and a catalyst, together with a carrier gas, are introduced into a vertically standing furnace through an inlet formed at the top of the furnace, carbon nanotubes are synthesized in the furnace, aggregates of the carbon nanotubes and the carrier gas descend to the bottom of the furnace, and the aggregates of the carbon nanotubes are wound up inside (see A in FIG. 1) or outside the furnace (see B in FIG. 1) to obtain a fiber. This method is advantageous over other methods in that carbon nanotube fibers can be mass produced at a spinning speed of a maximum of 20 to 30 m/min. However, the carbon nanotube fiber particles may again be twisted or agglomerate together on account of the characteristics of the fibrous particles and tend to be attached to the wall of the furnace. For these reasons, it is very difficult to easily discharge the carbon nanotube fiber particles.

Carbon fibers can also be produced by vapor-phase methods in which a raw material for carbon fibers and a catalyst react with each other by spraying them towards the inner wall of a reactor. A known vapor-phase method adopts a process in which a catalyst used in the initial synthesis of carbon fibers is allowed to react with a raw material by spraying the catalyst towards the inner wall of a reactor. However, since the catalyst is formed after colliding with the inner wall of the reactor, its flow becomes very irregular in and near the region where the catalyst is formed, and as a result, its size distribution becomes broad, which makes it difficult to produce carbon fibers with a sharp size distribution. Further, since the catalyst used in the initial synthesis of carbon fibers is allowed to react with a raw material by spraying the catalyst towards the inner wall of a reactor, it is difficult to produce branched carbon fibers with a uniform outer diameter.

SUMMARY OF THE INVENTION

One object of the present invention is to provide an apparatus for producing a carbon nanotube fiber with high efficiency.

A further object of the present invention is to provide a method for producing a carbon nanotube fiber using the apparatus.

Another object of the present invention is to provide a carbon nanotube fiber produced using the apparatus.

One aspect of the present invention provides an apparatus for producing a carbon nanotube fiber, including: a vertical reactor having an internal reaction zone; a concentric double-pipe inlet tube disposed on top of the reaction zone and consisting of an inner pipe through which a spinning feedstock including a spinning solution and a first gas is introduced into the reaction zone and an outer pipe defining a concentric annular portion surrounding the inner pipe and through which a second gas is introduced into the reaction zone; heating means for heating the reaction zone; and a discharge unit disposed under the bottom of the reaction zone to discharge a carbon nanotube fiber therethrough wherein the spinning feedstock entering the reaction zone through the inner pipe of the inlet tube is carbonized and graphitized while flowing from the top to the bottom of the reaction zone to form a carbon nanotube fiber consisting of a continuous sock (or aggregates) of carbon nanotubes and wherein the second gas entering the reaction zone through the outer pipe of the inlet tube forms a gas curtain surrounding the circumference of the carbon nanotube fiber while flowing from the top to the bottom of the reaction zone.

According to one embodiment, the second gas entering from the outer pipe of the inlet tube forms a gas curtain along the inner wall of the reactor so that the continuous sock of carbon nanotubes or the carbon nanotube fiber formed in the reaction zone can be physically prevented from approaching the inner wall of the reactor.

According to one embodiment, the second gas entering from the outer pipe of the inlet tube forms a gas curtain while flowing along the inner wall of the reactor so that a catalyst attached to the inner wall of the reactor can be physically removed.

According to one embodiment, an annular opening through which the outer pipe is in communication with the reaction zone may be spaced apart from an opening through which the inner pipe is in communication with the reaction zone.

According to a further embodiment, the annular opening may be separated from the inner pipe through an annular thermal insulator positioned between the inner pipe and the outer pipe.

The diameters of the gas curtain and the continuous sock of carbon nanotubes may be controlled by varying the distance between the inner pipe and the annular opening.

According to one embodiment, the reaction zone consists of a preheating zone and a heating zone and the spinning feedstock introduced into the reaction zone sequentially passes through the preheating zone and the heating zone.

According to one embodiment, the apparatus may further include a supply unit for supplying the spinning solution to the inner pipe of the inlet tube, a supply unit for supplying the first gas to the inner pipe of the inlet tube, and a supply unit for supplying the second gas to the outer pipe of the inlet tube.

According to one embodiment, spray means may be disposed at an opening through which the inner pipe of the inlet tube is in communication with the reaction zone and the spinning feedstock entering the inner pipe may be supplied to the reaction zone through the spray means.

According to one embodiment, the first gas may be supplied at such a linear velocity that laminar flows can be formed in the reaction zone and the second gas may be supplied at such a linear velocity that laminar flows can be formed in the reaction zone.

According to one embodiment, the first gas supply unit may have flow control means by which the first gas is supplied at such a linear velocity that laminar flows can be formed and the second gas supply unit may have flow control means by which the second gas is supplied at such a linear velocity that laminar flows can be formed.

According to one embodiment, the spinning solution supply unit may include a mixing unit where a catalyst or a catalyst precursor is dispersed in a liquid carbon compound to prepare the spinning solution and a transfer pump for supplying the spinning solution from the mixing unit to the inner pipe of the inlet tube.

According to one embodiment, each of the first gas and the second gas may be an inert gas, a reducing gas or a mixed gas thereof.

According to one embodiment, each of the first gas and the second gas released from the reactor may reenter the reactor through a circulation line for reuse.

The spinning solution may be a dispersion of a catalyst or a catalyst precursor in a liquid carbon compound.

According to one embodiment, the discharge unit may include winding means for winding and collecting the carbon nanotube fiber discharged from the bottom of the reactor.

According to one embodiment, the discharge unit may have an inlet through which an inert gas is fed to form an inert gas curtain surrounding the circumference of a continuous aggregate of the carbon nanotube fiber discharged from the reaction zone.

The present invention also provides a method for producing a carbon nanotube fiber using the apparatus.

The present invention also provides a carbon nanotube fiber produced using the apparatus.

In the apparatus of the present invention, a gas curtain is formed to physically block a spinning feedstock and a final carbon nanotube fiber from approaching the inner wall of the reactor. That is, the gas curtain reduces the contamination of the reactor inner wall. In addition, the gas curtain facilitates the discharge of the carbon nanotube fiber, enabling continuous long-term operation of the apparatus. The carbon nanotube fiber of the present invention is expected to find a variety of applications, including reinforcing agents of multifunctional composite materials, deformation/damage sensors using a stable and repetitive piezoresistive effect, transmission cables requiring high conductivity, and electrochemical devices, for example, microelectrode materials for biological substance detection, supercapacitors, and actuators, which require high specific surface area, excellent mechanical properties and high electrical conductivity.

BRIEF DESCRIPTION OF THE DRAWINGS

FIGS. 3 and 4 are perspective views (3a and 4a) and cross-sectional views (3b and 4b) schematically illustrating the structures of concentric double-pipe inlet tubes of apparatuses according to further embodiments of the present invention.

FIG. 6 shows the results of computational fluid dynamics (CFD) simulation for a flow of a sock in an apparatus of the present invention to which a gas curtain is applied, specifically, the gas curtain and the sock flow are shown in 6a and only the sock flow is shown in 6b.

DETAILED DESCRIPTION OF THE INVENTION

The present invention will now be described in more detail with reference to embodiments illustrated in the accompanying drawings. However, this is not intended to limit the present invention to particular modes of practice, and it is to be appreciated that all changes, equivalents, and substitutes that do not depart from the spirit and scope of the present invention are encompassed in the present invention.

Like reference numerals refer to the like elements throughout the drawings.

It will be understood that when an element is referred to as being "connected" or "coupled" to another element, it can be directly connected or coupled to the another element or intervening elements may be present.

As used herein, an expression used in the singular encompasses the expression of the plural, unless the context clearly indicates otherwise.

The terms "comprises", "comprising", "includes", "including", "has", "having", etc. are intended to indicate the existence of features, numbers, steps, operations, elements, components or combinations thereof disclosed in the specification, and are not intended to preclude the possibility that one or more other features, numbers, steps, operations, elements, components or combinations thereof may exist or may be added.

The term "carbon nanotube fiber" used herein is intended to include all types of fibers prepared by growth or fusion of carbon nanotubes.

Solution spinning, array spinning, aerogel spinning, and film twisting/rolling are known as techniques for producing carbon nanotube fibers. The present invention is based on chemical deposition (CD) in which a carbon nanotube fiber or ribbon is directly spun from a carbon nanotube aerogel formed immediately after feeding of a spinning solution into a reactor.

Direct spinning is a process in which a catalyst is added to a carbon source, the resulting spinning solution, together with a carrier gas, is introduced at a constant rate into a vertical furnace to synthesize carbon nanotubes, and a carbon nanotube fiber consisting of the carbon nanotubes only is produced in a continuous manner.

Hereinafter, the present invention will be described in more detail with reference to the accompanying drawings.

FIG. 1 schematically illustrates the internal constitutions of reactors of prior art apparatuses. In each of the apparatuses illustrated in FIG. 1, when a spinning solution enters the reactor, a carbon compound and a catalyst present in the spinning solution react with each other by spraying the spinning solution towards the inner wall of the hot reactor. This spraying contaminates the reactor inner wall and brings about a compositional change in the reaction zone, making it difficult to produce a uniform carbon nanotube fiber.

Figure 2:
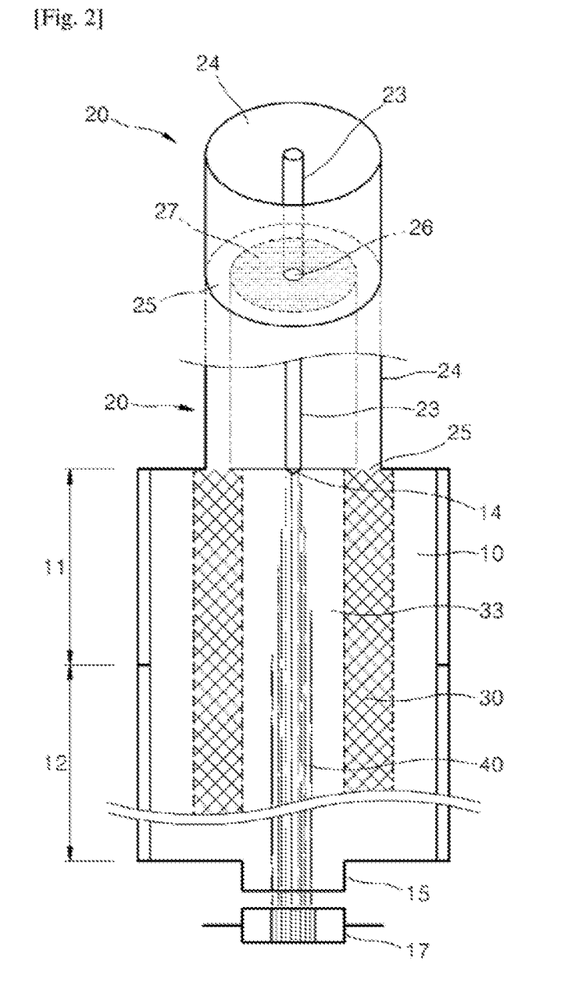
FIG. 2 illustrates the constitution of an apparatus for producing a carbon nanotube fiber according to one embodiment of the present invention.

FIG. 2 illustrates the constitution of an apparatus for producing a carbon nanotube fiber according to one embodiment of the present invention. The apparatus of the present invention is characterized in that a gas curtain is formed to surround a zone where a spinning feedstock is sprayed and can block a spinning solution and a catalyst present in the spinning feedstock from approaching the inner wall of a hot reactor, as illustrated in FIG. 2, Specifically, the apparatus of the present invention includes a reactor having a reaction zone 10; a concentric double-pipe inlet tube 20 disposed on top of the reaction zone 10 and consisting of an inner pipe 23 through which a spinning feedstock including a spinning solution and a first gas is introduced into the reaction zone 10 and an outer pipe 24 defining a concentric annular portion surrounding the inner pipe 23 and through which a second gas is introduced into the reaction zone 10; heating means not illustrated) for heating the reaction zone 10; and a discharge unit 15 disposed under the bottom of the reaction zone 10 to discharge a carbon nanotube fiber therethrough wherein the spinning feedstock entering the reaction zone 10 through the inner pipe 23 of the inlet tube 20 is carbonized and graphitized while flowing from the top to the bottom of the reaction zone 10 to form a carbon nanotube fiber consisting of a continuous sock 40 of carbon nanotubes and wherein the second gas entering the reaction zone 10 through the outer pipe 24 of the inlet tube 20 forms a gas curtain surrounding the circumference of the continuous sock of carbon nanotubes 40 while flowing from the top to the bottom of the reaction zone 10. The second gas entering from the outer pipe 24 of the inlet tube 10 can form the gas curtain 30 while flowing along the inner wall of the reactor. The gas curtain 30 physically prevents the continuous sock 40 of carbon nanotubes or the carbon nanotube fiber formed from the spinning feedstock in the reaction zone from approaching the inner wall of the reactor. Accordingly, the gas curtain facilitates the discharge of the carbon nanotube fiber from the reactor, enabling the production of the carbon nanotube fiber in an efficient manner.

The gas curtain 30 formed by the second gas entering the outer pipe 24 also serves to physically remove the catalyst attached to the inner wall of the reactor.

For the formation of the gas curtain 30, it is preferred that an annular opening 25 through which the outer pipe 24 is in communication with the reaction zone 10 is spaced apart from an opening 26 through which the inner pipe 23 is in communication with the reaction zone 10. As illustrated in FIG. 2, the opening 26 of the inner pipe is separated from the annular opening 25 through an annular portion 27.

By varying the distance between the opening 26 of the inner pipe and the annular opening 25 or the diameter of the annular portion 27, the diameter of the gas curtain 30 or the diameter of an internal zone 33 defined by the gas curtain 30 can be controlled, and as a result, the diameter of the continuous sock 40 of carbon nanotubes can also be controlled.

Only a portion of the outer pipe 24 in contact with the reactor is in communication with the reaction zone 10 through the annular opening 25, as illustrated in FIG. 2. In the concentric double-pipe inlet tube 20, the outer diameter of the inner pipe 23 may be the inner diameter of the outer pipe 24.

According to further embodiments, the outer circumference of the inner pipe 23 may be separated from the inner circumference of the outer pipe 24 through the annular portion 27, as illustrated in FIGS. 3a, 3b, 4a, and 4b. The annular portion 27 may be an empty space 27a. Alternatively, the annular portion 27 may be filled with an annular thermal insulator 27b. The diameters of the gas curtain 30 and the continuous sock 40 of carbon nanotubes can be controlled by varying the diameter of the annular portion 27b.

It is preferred that the annular portion 27 is filled with a thermal insulator when various conditions (e.g., reaction temperature) of the reactor are taken into consideration. The thickness of the thermal insulator can be determined depending on the heat transfer rate necessary for design and the thermal conductivity and optimum temperature of the spinning solution. The outer diameter of the inner pipe 23 and the inner diameter of the outer pipe 24 are determined by the thickness of the thermal insulator. The diameter of the inner pipe determines the diameter of the carbon nanotube fiber and the flow rate of the spinning solution. The flow pressure and rate of the gas entering the outer pipe determine the thickness and flow velocity of the gas curtain formed in the reaction zone. Accordingly, the diameters of the inner pipe 23 and the outer pipe 24 should be determined by collectively considering the average flow velocities, flow rates, and flow pressures of the entering gases and spinning solution. One of the factors of the gases should be equal to that of the spinning solution. The use of the thermal insulator can minimize the vibration of the apparatus caused by the flow of the fluids.

Figure 3A:
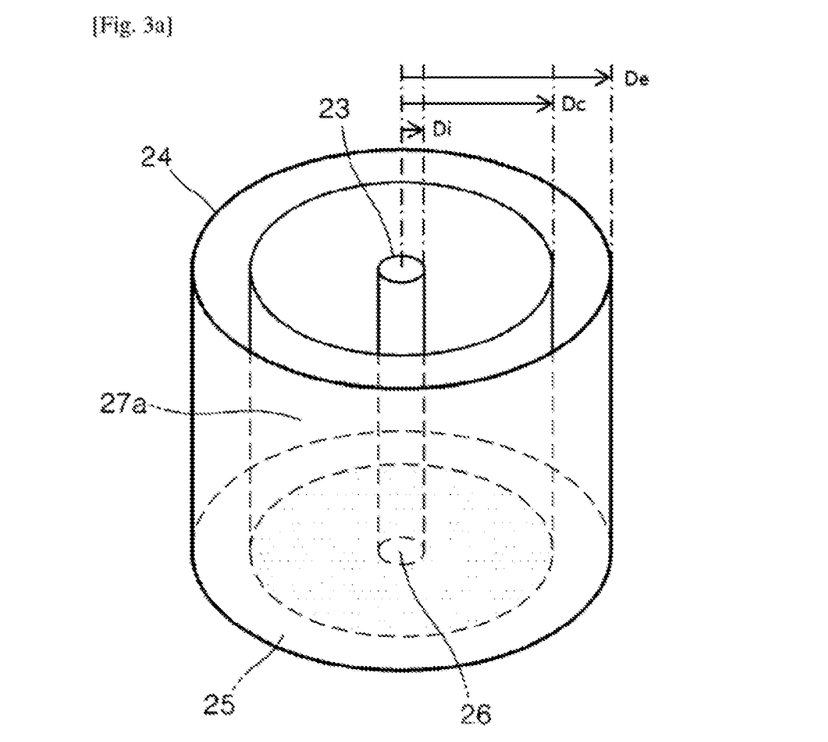
Figure 3B:
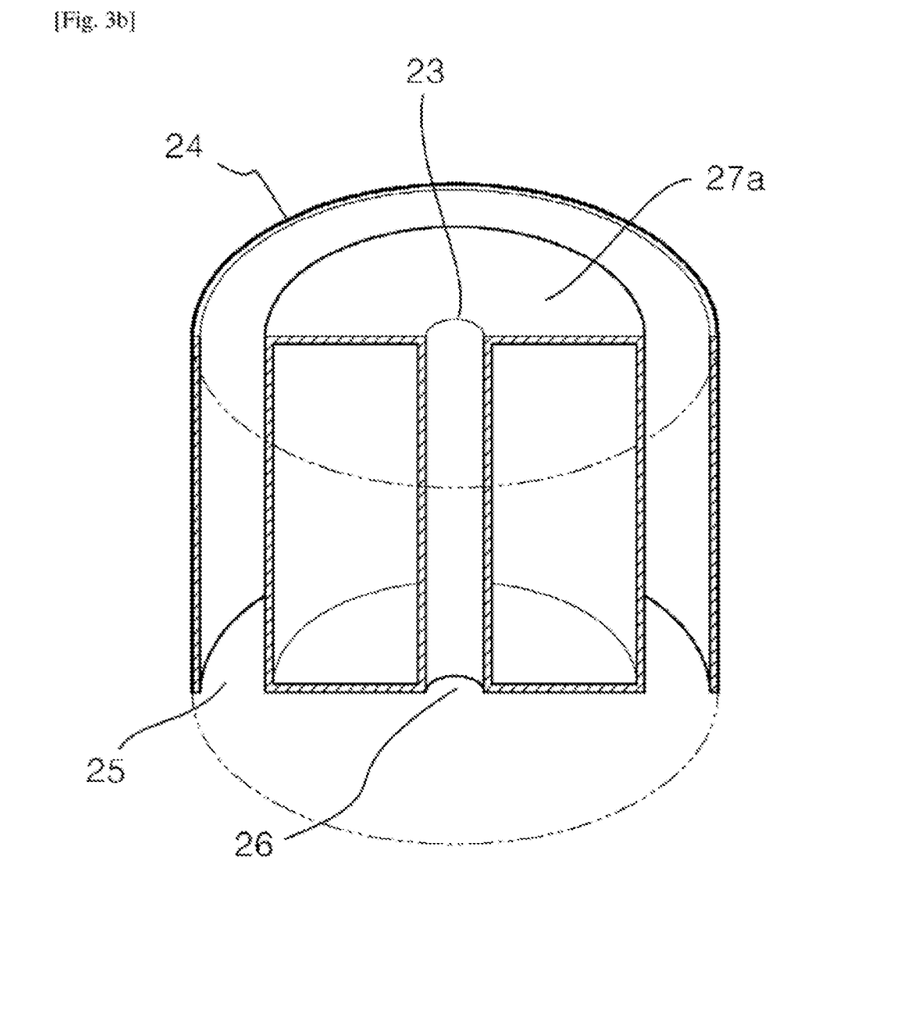
Figure 4A:
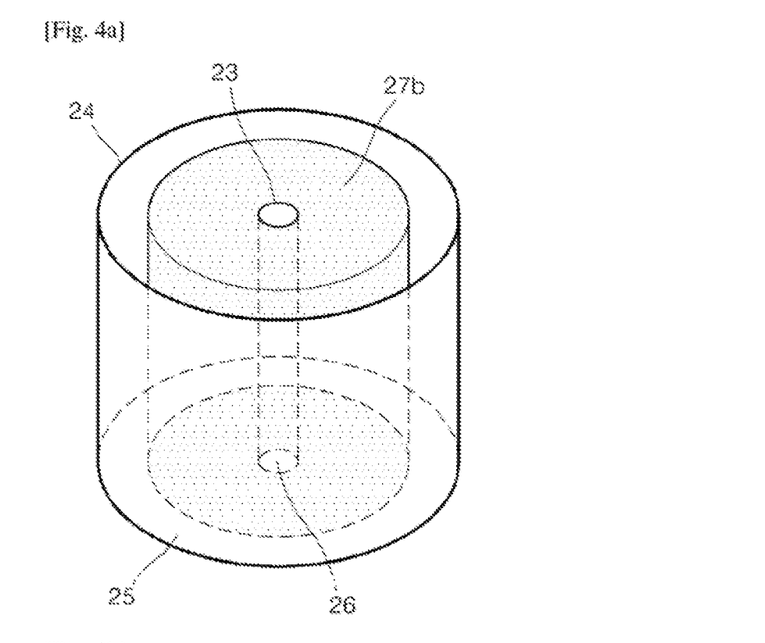
Figure 4B:
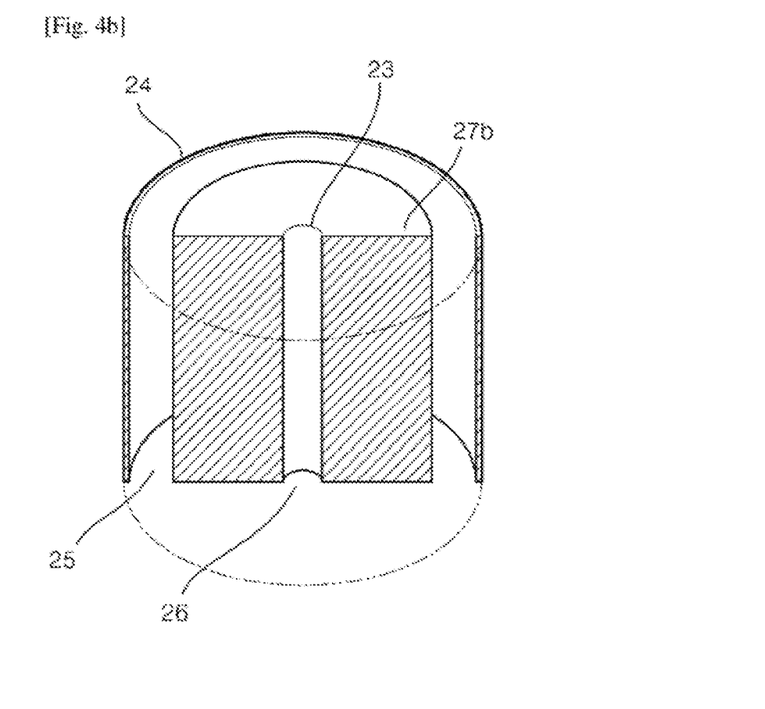

Specifically, as illustrated in FIG. 3a, the Reynolds number Re is determined from the diameter Di of the inner pipe 23, the diameter Dc of the annular portion 27, the diameter D3 of the outer pipe 24, and the flow velocity Vi, kind and temperature of an inert gas introduced through the annular opening 25.

The diameter D of the continuous sock of CNTs can be calculated by $D=a(Dc-Di)$, where $a=b \times Re^{-n}$ (where n and b are constants that vary depending on such conditions as the kind of the inert gas, the temperature of a heating zone 12, and the inner diameter of the reactor. For example, n may be greater than 0 but not greater than 1 and b may be in the range of 0.1 to 1000. That is, a is inversely proportional to the $n^{th}$ power of Re, indicating that the diameter D of the continuous aggregate of the CNT formed in the heating zone 12 decreases with increasing flow velocity of the inert gas.

For example, when the temperature of the heating zone is adjusted to 1200° C. using nitrogen gas, Re, n, and b are 2400, 0.5, and 12, respectively, from which a is calculated to be 0.25. Accordingly, the diameter of the continuous sock of CNTs can be easily controlled by varying the size of the annular portion.

Figure 5:
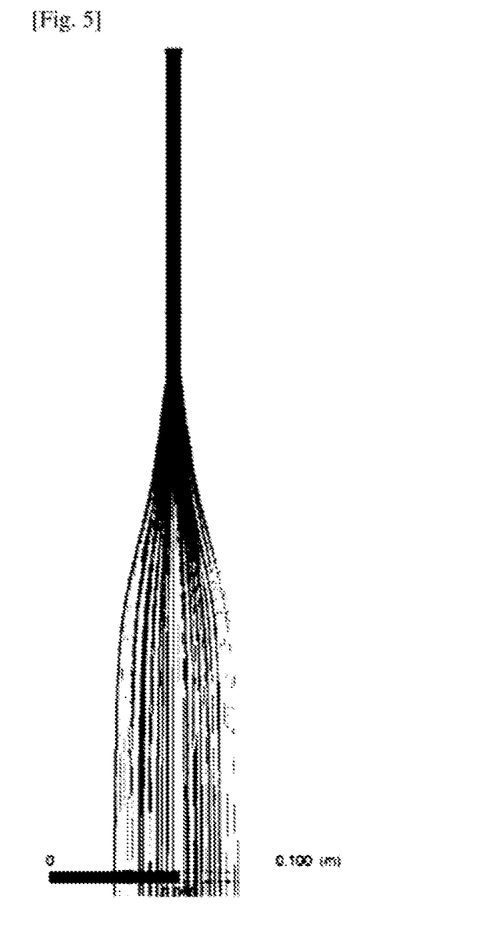
FIG. 5 shows the results of computational fluid dynamics (CFD) simulation for a flow of a sock in a conventional apparatus to which a gas curtain is not applied.

FIG. 5 shows the results of computational fluid dynamics (CFD) simulation for a flow of a sock in a conventional apparatus to which a gas curtain is not applied (ANSYS).

Figure 6A:
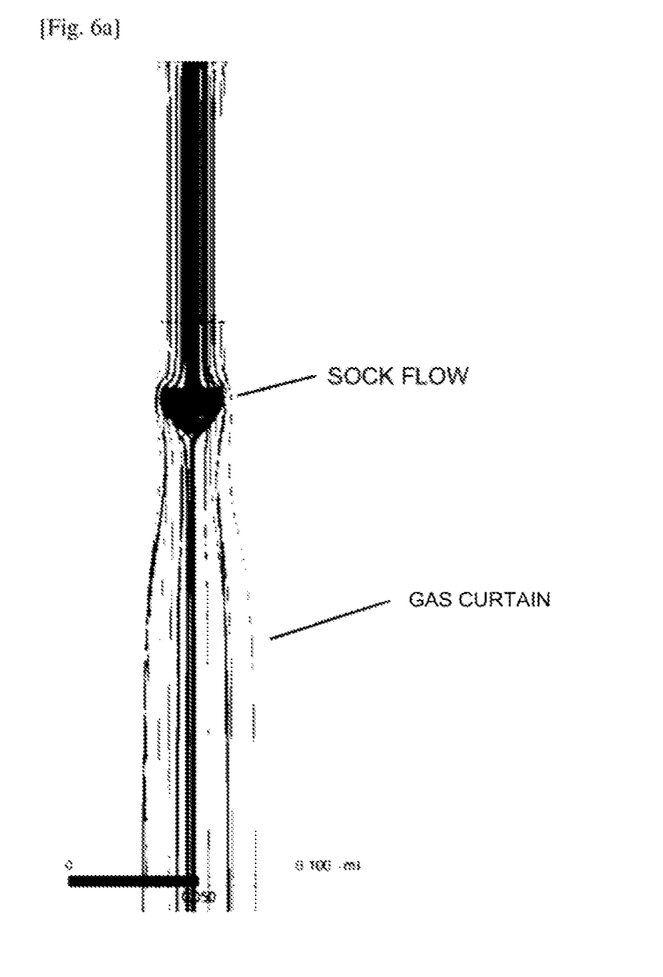
Figure 6B:
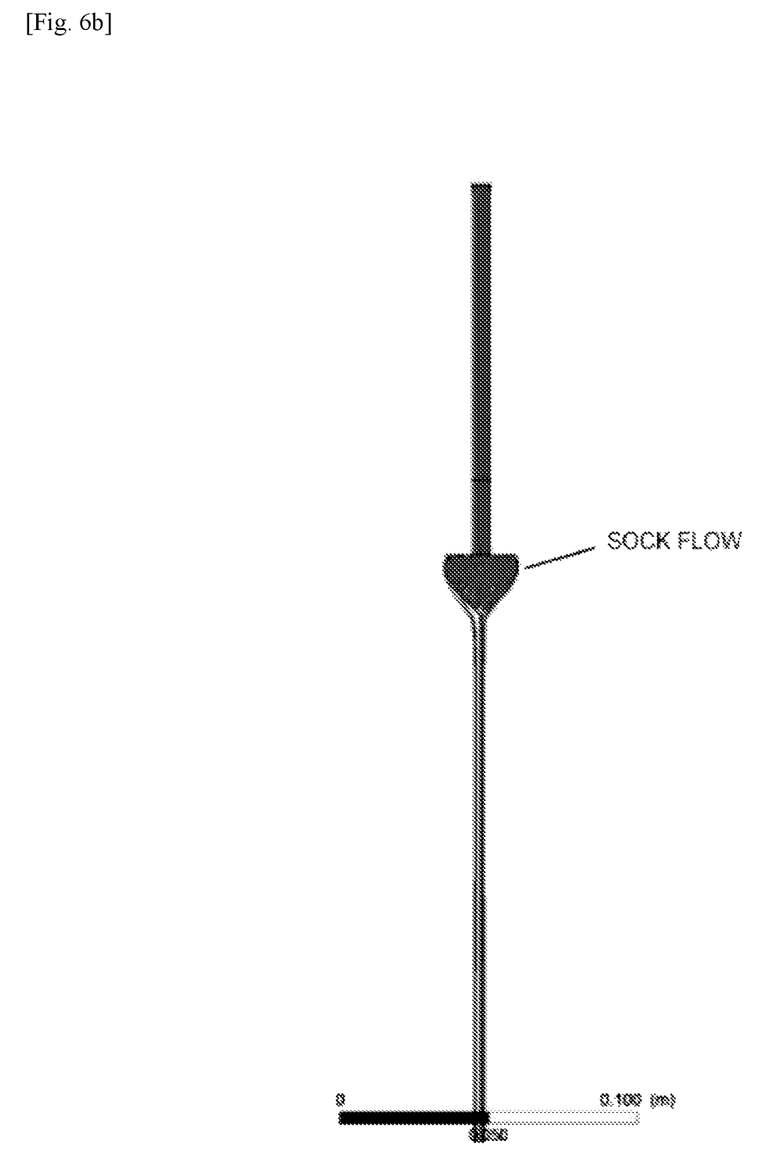

FIG. 6 shows the results of computational fluid dynamics (CFD) simulation for the sock flow in the apparatus of the present invention to which a gas curtain is applied. Specifically, the gas curtain is represented in blue in 6a and the sock flow is represented in red in 6b. As can be seen from FIG. 6, the application of the gas curtain limits the size of the descending sock.

According to a preferred embodiment, the diameter Di of the inner pipe 23, the diameter Dc of the annular portion 27, and the diameter De of the outer pipe 24 are in a ratio of 1:1-100:1-100 (Di:Dc:De), but are not limited thereto. As described before, the spinning solution and the first gas flow through the inner pipe 23, and the second gas entering through the inner pipe 23 forms a gas curtain. The first gas entering through the inner pipe 23 of the inlet tube 20 is a carrier gas that serves to transfer the spinning solution to the reaction zone 10.

The first gas (carrier gas) dilutes the spinning solution to control the amount of the spinning solution introduced into the reaction zone for the synthesis of carbon nanotubes. The first gas reacts with and discharge amorphous carbon and remaining impurities, resulting in an improvement in the purity of the carbon nanotube fiber.

Each of the first and second gases may be an inert gas, a reducing gas, or a mixed gas thereof.

The inert gas may be, for example, argon (Ar) or nitrogen ($N_2$) gas and the reducing gas may be, for example, hydrogen ($H_2$) or ammonia ($NH_3$) gas, but are not limited thereto.

The apparatus of the present invention may further include a supply unit (not illustrated) for supplying the second gas to the outer pipe 24 of the inlet tube 20, a supply unit (not illustrated) for supplying the spinning solution to the inner pipe 23 of the inlet tube 20, and a supply unit (not illustrated) for supplying the first gas to the inner pipe 23 of the inlet tube 20.

An unreacted portion of the first gas and/or the second gas supplied to the reactor may be released through a gas release tube (not illustrated) of the reactor. The gas released from the reactor can reenter the reactor through a circulation line (not illustrated) and the first supply unit and/or the second gas supply unit (not illustrated) for reuse.

Preferably, the second gas enters from the supply unit (not illustrated) for supplying the second gas to the outer pipe 24 of the inlet tube 20 at such a flow rate that the gas curtain 30 can be formed. Particularly, it is preferred for the reaction raw material and the gas curtain to form laminar flows in the reaction zone. To this end, it is preferred that the first gas enters the reaction zone at such a linear velocity that laminar flows can be formed and the second gas enters the reaction zone at such a linear velocity that laminar flows can be formed.

Accordingly, the first gas and the second gas flow into the reaction zone 10 from the corresponding gas supply units (not illustrated), each of which includes a gas tank and flow control means. By the flow control means, the gas is supplied at such a linear velocity that laminar flows can be formed.

According to a conventional method for producing a carbon nanotube fiber by direct spinning, a carrier gas is fed from the top of a furnace and moves to the bottom of the furnace, and turbulent flows are formed by natural convection, causing difficulty in synthesizing carbon nanotubes in a stable and continuous manner. In contrast, according to the present invention, laminar flows are formed by controlling the flow rate of the carrier gas so that continuous downward flows can be maintained. In addition, the formation of turbulent flows can be effectively prevented by the laminar gas curtain surrounding the reaction zone in which the carbon nanotube fiber is formed, resulting in the synthesis of carbon nanotubes in a stable and continuous manner. Proper control over the feeding rates of the carrier gas and the spinning solution is important for the formation of laminar flows in the hot zone of the reactor.

The carrier gas flow rate control means serves to control the retention time of a product in the reaction zone, particularly in the hot zone where catalyst particles are synthesized by thermal decomposition, so that a suitable time range can be obtained for the synthesis of carbon nanotubes with a desired length or a carbon nanotube fiber with a desired length, which consists of a continuous sock of carbon nanotubes. Due to the ability of the flow rate control means to control the retention time of the product in the hot zone, carbon nanotubes or a carbon nanotube fiber whose diameter is in the sub-nanometer range can be synthesized. To this end, the nanosized catalytic metal particles formed by thermal decomposition of the catalyst in the low-temperature zone can be prevented from increasing in diameter as a result of aggregation while passing through the hot zone where carbon nanotubes or a carbon nanotube fiber is synthesized.

When the mechanism of the synthesis of carbon nanotubes or a carbon nanotube fiber is taken into consideration, the retention time of the catalytic metal particles formed by thermal decomposition is adjusted to the range of 0.1 to 5 seconds irrespective of the size of the reaction zone. Within this range, carbon nanotubes or a carbon nanotube fiber with a diameter of 100 nm or less, preferably 60 nm or less can be synthesized. The diameter corresponds to the upper limit of the diameter of general carbon nanotubes or carbon nanotube fibers.

As the flow rate control means, for example, a ventilator or a vacuum pump, may be used. The flow rate control means may be a ventilator. In this case, the ventilator may include a fan and a body, both of which may be made of metals (e.g., steel) that are prevented from being corroded by exhaust gases. Preferably, an inverter is mounted in the ventilator to control the number of rotations of the fan. That is, the inverter can freely control the flow rate in the reaction zone. A pump may be used as the flow rate control means. In this case, the pump may be made of metals (e.g., steel) that are prevented from being corroded by exhaust gases. The pump is suitable when it is desired to freely control the flow rate even in the case where the flow rate in the reactor is high.

In the present invention, the spinning solution may be spun into the reaction zone 10 at a rate of 10 to 50 ml/min, preferably 10 to 40 ml/min, 10 to 30 ml/min or 10 to 20 ml/min.

The carrier gas may be introduced into the top of the reaction zone 10 of the reactor 1 at a linear velocity of 0.5 to 50 cm/min, preferably 0.5 to 40 cm/min, 0.5 to 30 cm/min, 0.5 to 20 cm/min or 1 to 10 cm/min. The linear velocity of the carrier gas may vary depending on various factors, such as the kind of the carrier gas, the size of the reactor, and the kind of the catalyst, as discussed previously.

The spinning solution is a dilution of a catalyst or a catalyst precursor in a carbon compound. The spinning solution may be prepared in the spinning solution supply unit (not illustrated), which includes a mixing unit where a catalyst or a catalyst precursor is dispersed in a liquid carbon compound to prepared the spinning solution and a transfer pump for supplying the spinning solution from the mixing unit to a spinning solution supply nozzle.

The spinning solution may contain 0.5 to 10% by weight, 1 to 5% by weight, or 1.5 to 4% by weight of the catalyst, based on the weight of the liquid carbon compound as a carbon source. The excess catalyst acts as an impurity, which makes it difficult to produce the carbon nanotube fiber in high yield and may be a cause of poor thermal, electrical, and physical properties of the carbon nanotube fiber.

The spinning solution may further include a catalyst activator.

Generally, carbon is diffused into the catalyst in a molten state and is then deposited to synthesize carbon nanotubes. The catalyst activator is used as a promoter that increases the diffusion rate of carbon to allow the synthesis of carbon nanotubes in a short time.

In the present invention, the carbon compound as a carbon source is diffused into the catalyst to synthesize carbon nanotubes and is selected taking into consideration the desired molecular weight distribution, concentration, viscosity, surface tension, and dielectric constant of carbon nanotubes, and the characteristics of a solvent used. The liquid carbon compound may be selected from the group consisting of ethanol, methanol, propanol, acetone, xylene, chloroform, ethyl acetate, diethyl ether, polyethylene glycol, ethyl formate, mesitylene, tetrahydrofuran (THF), dimethylformamide (DMF), dichloromethane, hexane, benzene, carbon tetrachloride, and pentane.

The liquid carbon compound is preferably ethanol ($C_2H_5OH$), xylene ($C_8H_{10}$), diethyl ether [$(C_2H_5)_2O$], polyethylene glycol [$—(CH_2—CH_2—O)_9$], 1-propanol ($CH_3CH_2CH_2OH$), acetone ($CH_3OCH_3$), ethyl formate ($CH_3CH_2COOH$), benzene ($C_6H_6$), hexane ($C_6H_{14}$) or mesitylene [$C_6H_3(CH_3)_3$].

The catalyst may include at least one metal or oxide selected from the group consisting of, but not limited to, iron, nickel, cobalt, platinum, ruthenium, molybdenum, vanadium, and oxides thereof. The catalyst may be in the form of nanoparticles. The catalyst is preferably a metallocene containing iron, nickel or cobalt. For example, the catalyst is ferrocene.

The catalyst activator may be, for example, a sulfur-containing compound. Specifically, the catalyst activator may be a sulfur-containing aliphatic compound, such as methylthiol, methyl ethyl sulfide or dimethyl thioketone, a sulfur-containing aromatic compound, such as phenylthiol or diphenylsulfide, or a sulfur-containing heterocyclic compound, such as pyridine, quinoline, benzothiophene or thiophene. The catalyst activator is preferably thiophene. Thiophene lowers the melting point of the catalyst and removes amorphous carbon, enabling the synthesis of carbon nanotubes in high yield at low temperature. The content of the catalyst activator may also affect the structure of carbon nanotubes. For example, a multi-wall carbon nanotube fiber may be produced when 1 to 5% by weight of thiophene is mixed with ethanol, while a single-wall carbon nanotube fiber may be produced when 0.5% by weight or less of thiophene is mixed with ethanol.

The spinning solution enters the reactor from the spinning solution supply unit through the inner pipe 23. Preferably, the spinning solution is supplied to the reaction zone 10 through spray means 14 provided in the opening 26 of the inner pipe 23.

The spray means 14 is connected to the carrier gas (first gas) supply unit and the spinning solution supply unit to spray the spinning feedstock including the carrier gas and the spinning solution into the reaction zone. Here, the spinning solution tends to be stretched due to its high viscosity when sprayed through the spray means. This tendency leads to the production of a long thick carbon nanotube fiber. The spray means uniformly sprays the catalyst or catalyst precursor dispersed in the spinning solution on the reaction zone to allow the catalyst particles to have uniform sizes, enabling the synthesis of carbon nanotubes with uniform diameters or a carbon nanotube fiber with a uniform diameter.

A spray nozzle may be used to spray the spinning solution and the carrier gas. Alternatively, a rotary atomizer or a shower head may also be used. The atomizer is operated to supply a liquid resin in such a manner to rotate and scatter the liquid resin. The use of the atomizer makes the final product close to ellipsoidal in shape rather than spherical. A shower head may be suitable in which spray holes are distributed uniformly on the surface or distributed helically at uniform intervals on the surface.

The reaction of the spinning feedstock introduced into the reaction zone 10 through the spray means 14 proceeds in the hot reaction zone 10, which is heated by the heating means (not illustrated).

The heating means (not illustrated) may be a furnace surrounding the reactor and can heat the reaction zone 10 to 1,000 to 3,000° C. By the heating means, the hot zone 10 is preferably maintained at a temperature of 1,000 to 2,000° C., 1,000 to 1,500° C., or 1,000 to 1300° C., more preferably 1,100 to 1,200° C. The temperature of the hot zone of the reactor affects the diffusion rate of carbon into the catalyst to control the growth rate of carbon nanotubes. When carbon nanotubes are synthesized by chemical deposition, the growth rate of carbon nanotubes generally increases with increasing synthesis temperature, achieving improved crystallinity and strength.

According to a preferred embodiment, the reaction zone 10 consists of a preheating zone 11 and a heating zone 12 and the spinning feedstock reacts while sequentially passing through the preheating zone and the heating zone.

In the preheating zone 11, the spinning feedstock is heated to a temperature suitable for graphitization and the catalyst precursor included in the spinning feedstock is converted to the corresponding catalyst. The temperature of the preheating zone may be from 0 to 900° C.

In the heating zone 12, the liquid hydrocarbon included in the spinning feedstock forms carbon nanotubes by the graphitization catalyst, and at the same time, a continuous sock of the carbon nanotubes is formed. The temperature of the heating zone may be from 900 to 1500° C.

The spinning feedstock including the catalyst precursor or catalyst is sprayed on the reaction zone 10 maintained at high temperature. Since there is a large difference in evaporation temperature between the components, the component having a lower evaporation point is first evaporated and the catalyst or catalyst precursor having a higher evaporation point remains in the spray means and is then sprayed rapidly. As a result, the catalyst or catalyst precursor is deposited on or attached to the inner wall of the hot reactor. The contaminated inner wall of the reactor needs to be replaced with a new one. The contamination causes a compositional change in the reaction zone, leading to considerable deterioration of the reaction efficiency. In the apparatus of the present invention, the formation of the gas curtain 30 prevents the sprayed catalyst or catalyst precursor from being attached to the inner wall and the use of continuous downward flows applied to the inner wall enables the removal of the attached catalyst.

The gas curtain formed around the spray nozzle 14 serves as a barrier to a sudden temperature change by heat transferred from the furnace. Thus, the gas curtain allows the spinning feedstock to undergo stepwise temperature rise and thermal expansion, enabling the production of a uniform continuous aggregate 20 of a carbon nanotube fiber in the internal zone 33 defined by the gas curtain.

The gas curtain applies downward laminar flows to the spinning feedstock sprayed from the spray nozzle, allowing the spinning feedstock to have a directivity. It is thus difficult for carbon nanotubes or a carbon nanotube fiber to come into contact with the inner wall, facilitating the discharge of the product and achieving improved yield of the product.

Carbon nanotubes are synthesized in the reaction zone 10 and form a continuous cylindrical sock 40 while descending towards the discharge unit 15 disposed under the bottom of the reaction zone 10. The sock is collected, drawn out from the reactor, and wound around the winding means 17 to obtain a fiber.

The winding means 17 may be any suitable means that can stably wind the carbon nanotube fiber discharged from the heating zone. For example, the winding means 17 may be a spindle, reel, drum, or conveyor.

The winding temperature and speed affect the alignment of the carbon nanotubes in the direction of the fiber axis to determine the thermal, electrical, and physical properties of the carbon nanotube fiber. Preferably, the carbon nanotubes are wound at a speed ranging from 5 to 50 rpm at a temperature of 15 to 120° C.

The discharge unit 15 may have an inlet through which an inert gas is fed to form an inert gas curtain (not illustrated) surrounding the circumference of a continuous aggregate of the carbon nanotube fiber. The discharge unit 15 may have an outlet through which the carbon nanotube fiber is discharged and an exhaust gas line through which the carrier gas is released.

According to the present invention, there is provided a method for producing a carbon nanotube fiber using the apparatus. Specifically, the method includes (a) preparing a spinning solution containing a catalyst dispersed in a liquid carbon compound, (b) preparing a first gas as a carrier gas, (c) preparing a second gas for forming a gas curtain, (d) introducing the second gas into the reactor through the outer pipe 24 of the inlet tube 20 to form a gas curtain 30 in the reaction zone 10, (e) introducing the spinning solution and the first gas into the internal zone 33 surrounded by the gas curtain 30 from the top of the reaction zone 10 through the inner pipe 23 of the inlet tube 20, (f) allowing the spinning solution to react to form a continuous sock 40 of carbon nanotubes while descending in the internal zone 33 defined by the gas curtain 30, and (g) winding the continuous sock 40 of carbon nanotubes under the bottom of the reactor to produce a carbon nanotube fiber.

The present invention also provides a carbon nanotube fiber produced using the apparatus.

It will be understood by those skilled in the art that the invention can be implemented in other specific forms without changing the spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A method for producing a carbon nanotube fiber, with an apparatus comprising:
   a vertical reactor having a reaction zone;
   a concentric double-pipe inlet tube disposed on top of the reaction zone and consisting of an inner pipe through which a spinning feedstock comprising a spinning solution and a first gas is introduced into the reaction zone and an outer pipe defining a concentric annular portion surrounding the inner pipe and through which a second gas is introduced into the reaction zone;
   a heating mechanism for heating the reaction zone; and
   a discharge unit disposed under the bottom of the reaction zone to discharge a carbon nanotube fiber there through,
   wherein the spinning feedstock entering the reaction zone through the inner pipe of the inlet tube is carbonized and graphitized while flowing from the top to the bottom of the reaction zone to form a carbon nanotube fiber consisting of a continuous sock of carbon nanotubes;
   wherein the second gas entering the reaction zone through the outer pipe of the inlet tube forms a gas curtain surrounding the circumference of the continuous sock of carbon nanotubes while flowing from the top to the bottom of the reaction zone; and
   wherein a sprayer is disposed at an opening through the inner pipe of the inlet tube and is in communication with the reaction zone and the spinning feedstock entering the inner pipe, and the sprayer is configured and arranged to spray the spinning solution in the reaction zone;
   the method comprising the steps of;
   introducing the second gas into the reaction zone through the outer pipe of the inlet tube to form a gas curtain in the reaction zone,
   introducing the first gas into the reaction zone surrounded by the gas curtain through the inner pipe of the inlet tube,
   allowing the spinning solution to react to form a continuous sock of carbon nanotubes while descending in an internal zone defined by the gas curtain, and
   winding the continuous sock of carbon nanotubes under a bottom of the reactor to produce a carbon nanotube fiber.

2. The according to claim 1, wherein the second gas entering from the outer pipe of the inlet tube forms a gas curtain along the inner wall of the reactor so that the continuous sock of carbon nanotubes or the carbon nanotube fiber formed in the reaction zone is physically prevented from approaching the inner wall of the reactor.

3. The method according to claim 1, wherein the second gas entering from the gas inlet tube forms a gas curtain while flowing along the inner wall of the reactor so that a catalyst attached to the inner wall of the reactor is physically removed.

4. The method according to claim 1, wherein an annular opening through which the outer pipe is in communication with the reaction zone is spaced apart from the inner pipe.

5. The method according to claim 4, wherein the annular opening is separated from an opening, through which the inner pipe is in communication with the reaction zone, through an annular thermal insulator positioned between the inner pipe and the outer pipe.

6. The method according to claim 1, wherein the reaction zone consists of a preheating zone and a heating zone and the spinning feedstock introduced into the reaction zone sequentially passes through the preheating zone and the heating zone.

7. The method according to claim 1, wherein the apparatus further comprises a supply unit for supplying the spinning solution to the inner pipe of the inlet tube, a supply unit for supplying the first gas to the inner pipe of the inlet tube, and a supply unit for supplying the second gas to the outer pipe of the inlet tube.

8. The method according to claim 1, wherein the first gas or the second gas is supplied at such a linear velocity that laminar flows are formed in the reaction zone.

9. The method according to claim 7, wherein the first gas supply unit has a flow controller, by which the first gas is supplied at such a linear velocity that laminar flows are formed and the second gas supply unit has a flow controller, by which the second gas is supplied at such a linear velocity that laminar flows are formed.

10. The method according to claim 7, wherein the mixing unit prepares the spinning solution as a catalyst or a catalyst precursor in a carbon source.

11. The method according to claim 1, wherein each of the first gas and the second gas is an inert gas, a reducing gas or a mixed gas thereof.

12. The method according to claim 1, wherein the apparatus further comprises a circulation line through which each of the first gas and the second gas released from the reactor reenters the reactor for reuse.

13. The method according to claim 1, wherein the spinning solution is a catalyst or a catalyst precursor in a carbon source.

14. The method according to claim 1, wherein the discharge unit comprises a winder, for winding and collecting the carbon nanotube fiber discharged from the bottom of the reactor.

15. The method according to claim 1, wherein the discharge unit has an inlet through which an inert gas is fed to form an inert gas curtain surrounding the circumference of a continuous aggregate of the carbon nanotube fiber discharged from the reaction zone.

16. A carbon nanotube fiber produced using the method according to claim 1.

17. The method according to claim 10, wherein the carbon source is ethanol, methanol, propanol, acetone, xylene, chloroform, ethyl acetate, diethyl ether, polyethylene glycol, ethyl formate, mesitylene, tetrahydrofuran (THF), dimethylformamide (DMF), dichloromethane, hexane, benzene, carbon tetrachloride, or pentane.

18. The method according to claim 13, wherein the carbon source is ethanol, methanol, propanol, acetone, xylene, chloroform, ethyl acetate, diethyl ether, polyethylene glycol, ethyl formate, mesitylene, tetrahydrofuran (THF), dimethylformamide (DMF), dichloromethane, hexane, benzene, carbon tetrachloride, or pentane.

19. The method according to claim 1, wherein the sprayer comprises a nozzle, an atomizer or a shower head.

* * * * *